United States Patent
Horiuchi

[11] Patent Number: 5,315,435
[45] Date of Patent: May 24, 1994

[54] IMAGE STABILIZING OPTICAL SYSTEM

[75] Inventor: Akihisa Horiuchi, Kawasaki, Japan

[73] Assignee: Canon Kabushiki Kaisha, Tokyo, Japan

[21] Appl. No.: 700,609

[22] Filed: May 15, 1991

[30] Foreign Application Priority Data

May 16, 1990 [JP] Japan .................. 2-127887

[51] Int. Cl.$^5$ .................. G02B 27/64; G02B 5/06
[52] U.S. Cl. .................. 359/554; 359/557; 359/832; 359/666; 359/676; 359/683; 359/688
[58] Field of Search .................. 359/554, 557, 832, 666, 359/676, 678, 683, 685, 688

[56] References Cited

U.S. PATENT DOCUMENTS

| | | | |
|---|---|---|---|
| 3,503,663 | 3/1970 | de la Cierva et al. | 359/557 |
| 3,531,176 | 9/1970 | Humphrey | 359/554 |
| 3,941,451 | 3/1976 | Humphrey | 359/557 |
| 3,942,862 | 3/1976 | Furukawa et al. | 359/557 |
| 3,944,324 | 3/1976 | Tajima et al. | 359/557 |
| 4,927,250 | 5/1990 | Suda | 359/557 |
| 5,040,881 | 8/1991 | Tsuji | 359/557 |
| 5,069,537 | 12/1991 | Kitagishi | 359/557 |

FOREIGN PATENT DOCUMENTS 140120  6/1989  Japan .................. 359/554

Primary Examiner—Jon W. Henry
Attorney, Agent, or Firm—Fitzpatrick, Cella, Harper & Scinto

[57] ABSTRACT

This specification discloses an image stabilizing phototaking lens system having a lens system in which a plurality of lens units are disposed and at least one lens spacing is changed to change the focal length, and a variable vertical angle prism unit whose vertical angle is changed and driven to refract the optic axis immediately rearwardly of a predetermined lens surface which satisfies the condition that $|Fa| < 10$ Ft, where Fa is the combined focal length from the front lens surface of the lens system to the predetermined lens surface, and Ft is the focal length of the entire lens system at the telephoto end thereof.

10 Claims, 3 Drawing Sheets

IMAGE STABILIZING OPTICAL SYSTEM

BACKGROUND OF THE INVENTION

Field of the Invention

This invention relates to a magnification changing optical system, particularly a compact magnification changing optical system, suited to correct image vibration caused by the tilting of the optical system and achieve image stabilization.

Related Background Art

When photographing on a vehicle, a ship or an aircraft which is moving, or when photographing while walking, vehement trembling is apt to be given to an image thereby making the image difficult to see and therefore, a normal (or good) image cannot be obtained particularly when exposure time is long.

Generally, when photographing is to be effected with a lens of long focal length mounted on a single-lens reflex camera, it is usual to fix the camera to a tripod, but this impairs maneuverability and therefore it is often the case that the camera is used while being held in hand, and in some cases, image vibration prevents the obtainment of a good image. Also, recently, the enhancement of the magnification of photo-taking lenses mounted on video cameras has posed the remarkable problem that good images are not obtained.

Various anti-vibration optical systems or image stabilizing optical systems have been proposed to prevent such image vibration, and there is well known, for example, a construction in which bellows with transparent liquid of a predetermined refractive index enclosed therein are provided forwardly of a photo-taking lens and the angle formed between the incidence surface and emergence surface of the bellows is controlled so that the angle of light refraction of an optical wedge formed by the bellows may correct the angle of inclination of the photo-taking lens.

However, if the photo-taking lens is a zoom lens, particularly of high magnification zoom, the diameter of the bellows disposed forwardly of the lens becomes large and the bellows themselves are a hindrance and also, it is difficult to change the vertical angle at a high speed, and this also gives rise to the problem that it becomes difficult to follow a high frequency well.

In order to eliminate such a problem, it has been separately proposed to dispose bellows between the afocal portion, specifically the magnification changing portion, of a zoom lens and a relay lens, but another problem has resulted from this. That is, the problem is that in a video camera or a still video camera, which uses a solid state image pickup device such as CCD or MOS in the image receiving portion thereof, the light receiving surface of the device is high in reflectance and therefore part of an imaging light beam is reflected thereby and travels back along the optical path, is reflected by the incidence surface or the emergence surface of the bellows or both, enters the solid state image pickup device again and forms ghost or flare, thus deteriorating the quality of image. Of course, in the case of silver salt film, a similar problem arises to one degree or another. Also, a technique whereby a variable vertical angle prism is disposed in an objective lens is disclosed in U.S. application Ser. No. 291,263 (filed on Dec. 28, 1988) abandoned in favor of U.S. patent application Ser. No. 701,326 (filed May 7, 1991), which is commonly assigned with the present application.

SUMMARY OF THE INVENTION

The present invention eliminates the above-noted problems, and makes the apparatus compact and does not deteriorate the quality of image.

A feature of the present invention is that when a variable vertical angle prism unit whose vertical angle is changed and driven to refract the optic axis is to be disposed in a lens system wherein at least one lens spacing in a plurality of lens units is changed to thereby change the focal length, the variable vertical angle prism is disposed at a position which satisfies the condition that $|Fa| < 10\ FT$, where Fa is the combined focal length from the front lens surface of the lens system to the surface immediately front of the variable vertical angle prism unit, and Ft is the focal length of the entire system at the telephoto end thereof. This condition has been found from the optical analysis of lenses including various zoom lenses which will be described later having been effected on a power arrangement which does not cause a substantially problematic degree of ghost or flare on the image plane. The zoom lenses used are all comprised of lenses, but the present invention is also applicable to zoom lenses including spherical lenses.

DESCRIPTION OF THE PREFERRED EMBODIMENTS

Figure 1:
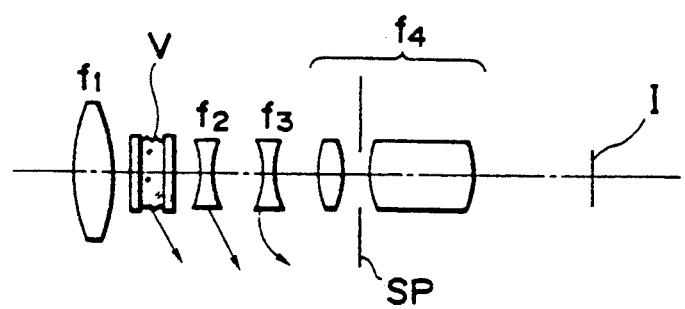
FIG. 1 is an optical cross-sectional view showing a first embodiment of the present invention.

FIG. 1 shows a first embodiment of the present invention. In FIG. 1, it is to be understood that an object is on the left side, and a first lens unit $f_1$ of positive refractive power is moved back and forth in the direction of the optic axis for focusing. The reference character $f_2$ designates a second lens unit of negative refractive power having the magnification changing function which is moved in the direction of the optic axis by a driving mechanism, not shown. The reference character $f_3$ denotes a third lens unit of negative refractive power for negating the movement of the image plane. The third lens unit $f_3$ is moved with the second lens unit $f_2$ and independently along a locus shown in the figure. The reference numeral $f_4$ designates a so-called relay lens unit having the imaging action. I denotes the image plane on which the image receiving surface of a solid state image pickup device is located. SP designates a stop for determining the brightness of the system.

Figure 2:
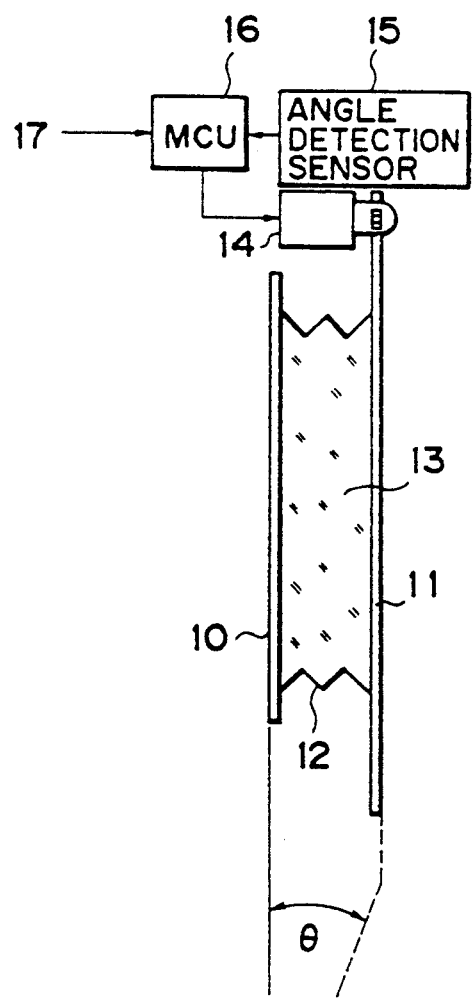
FIG. 2 illustrates a variable vertical angle prism unit.

V denotes a variable vertical angle prism unit, which is shown on an enlarged scale with a driving portion in FIG. 2. The reference numerals 10 and 11 designate a light transmitting entrance end plate and a light transmitting exit end plate. The reference numeral 12 denotes a bendable thin film cylinder constituting bellows, and the reference numeral 13 designates light transmitting liquid having a desired refractive index which is enclosed in the space defined by the thin film cylinder 12 and the end plates 10 and 11. Accordingly, when for example, the end plate 10 is fixed and the edge of the end plate 11 is pressed, the end plate 11 is inclined and an optical wedge of a vertical angle $\theta$ is formed.

The reference numeral 14 denotes an actuator having its driving shaft flexibly connected to the end plate 11. Although only one actuator 14 is shown, it is to be understood that for example, three actuators are spaced apart by 120° from one another and provided about the optic axis or one more actuator is provided for the end plate 11 through a gimbal mechanism so that desired optical wedges may be formed with respect to all radial directions. The reference numeral 15 designates an inclination angle detecting sensor which may be, for example, a gyro or acceleration sensor. It is to be understood that a plurality of such inclination angle detecting sensors 15 are provided about the optic axis, and they can detect the inclination of a photo-taking lens in any direction. The reference numeral 16 denotes a microcomputer which calculates the amount of outward and inward movement of the driving shaft of each actuator 14 on the basis of magnification change information taking into account the output of each inclination angle detecting sensor 15 and the position at which the variable vertical angle prism unit is disposed, and controls each actuator 14 by an output signal. A soft elastic resin plate may be employed instead of the liquid and thin film cylinder.

Turning back to FIG. 1, the variable vertical angle prism unit V is fixed to the movable inner cylinder, not shown, of the second lens unit $f_2$ immediately in front of the second lens unit $f_2$ and thus, it is moved with the second lens unit, and this leads to the advantage that even if a magnification change is effected, the amount of revision of the vertical angle $\theta$ of the prism may be small and can be easily controlled.

Figure 3:
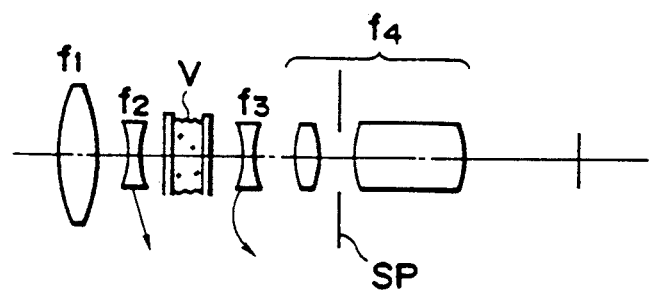
FIGS. 3 to 10 are optical cross-sectional views showing second to ninth embodiments of the present invention in succession.
Figure 4:
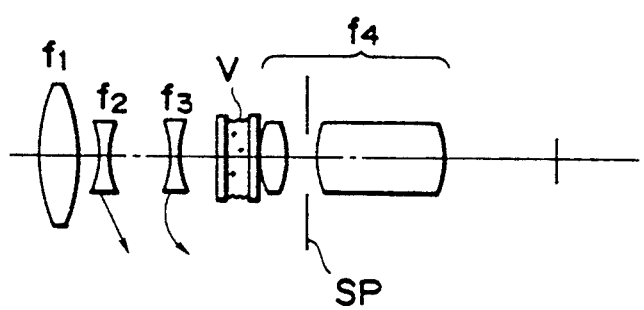

FIGS. 3 and 4 show zoom lenses similar to the zoom lens of FIG. 1, but it is to be understood that the position of disposition of the variable vertical angle prism unit V is fixed unlike the case of FIG. 1. Although each lens unit is shown as a lens component, it is to be understood that actually, each lens unit is comprised of one or more lens components.

Figure 5:
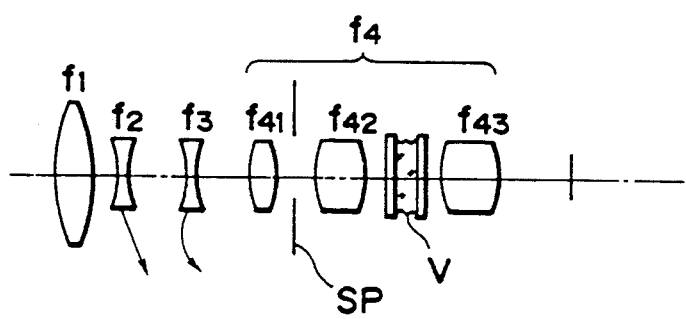
Figure 6:
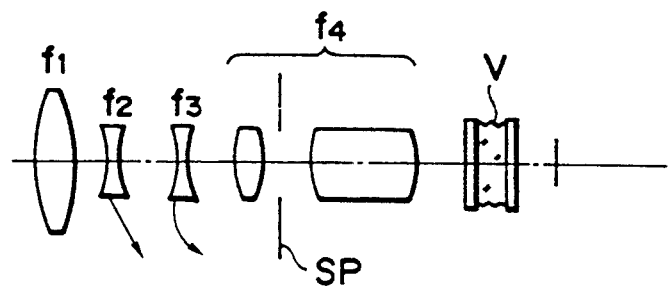

FIG. 5 shows another embodiment of the present invention which corresponds to a fourth numerical value example which will be described later. The fourth lens unit $f_4$ is divided into three sub-lens units, and the variable vertical angle prism unit V is fixed between second and third sub-lens units $f_{42}$ and $f_{43}$. There is usually a relatively great air space in the relay lens unit, and this leads to the advantage that the full lens length need not be extended to provide the variable vertical angle prism unit. Also, the prism unit is in the fixed lens unit, and this leads to the ease with which the prism unit is fixed and the simplicity of the structure of a lens barrel mechanism or the like. Further, optically, this is a location at which the degree of sensitiveness when the vertical angle is changed becomes high and therefore, the range of change in the vertical angle becomes small, and this is useful to quicken the driving and advantageous to make the system compact. FIG. 6 shows a fifth embodiment in which the variable vertical angle prism unit V is fixedly disposed between the zoom lens and the image plane I. A space is already secured as the back focal length between the zoom lens and the image plane, and this leads to the advantage that the full lens length does not become great.

Figure 7:
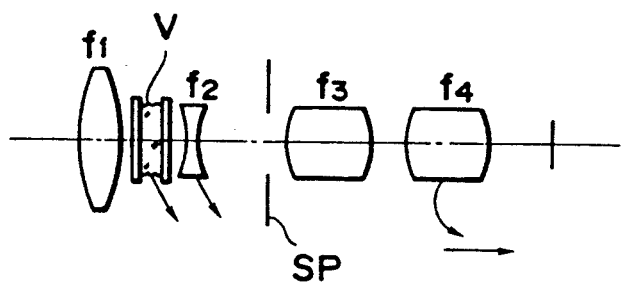

FIG. 7 shows a sixth embodiment which has, in succession from the object side, a first lens unit $f_1$ of positive refractive power, a second lens unit $f_2$ of negative refractive power, a third lens unit $f_3$ of positive refractive power and a fourth lens unit $f_4$ of positive refractive power and in which the second lens unit is moved to effect a magnification change and the fluctuation of the image plane resulting from a magnification change is corrected by the fourth lens unit being moved and a variable vertical angle prism unit V is disposed between the first lens unit and the second lens unit of the optical system in which the fourth lens unit is moved to effect focusing. As in the previously described first embodiment, the prism unit is adapted to be moved with the second lens unit, and this is useful to make the system compact and light in weight, and the difference in the amount of variation in the vertical angle of the prism resulting from a magnification change is small and the control of the prism unit becomes easy.

Figure 8:
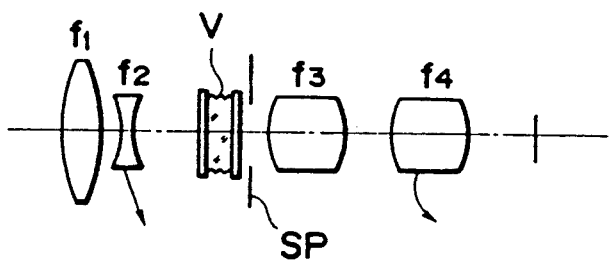
Figure 9:
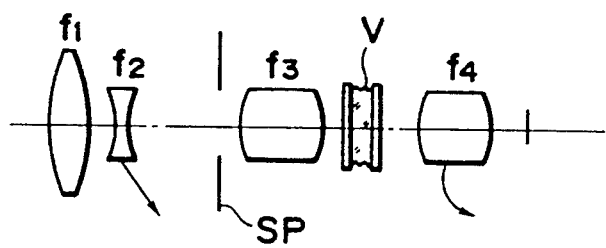

FIGS. 8 and 9 show a seventh and an eighth embodiment, respectively. In these embodiments, the construction of the zoom lens is similar to that shown in FIG. 7, but the variable vertical angle prism unit V is disposed forwardly or rearwardly of the third lens unit $f_3$, and the third lens unit $f_3$ is located near the stop SP and therefore, a light beam passing therethrough is stopped, and this leads to the advantage that the outer diameter of the prism unit can be made small. Also, the fact that the prism unit is near the fixed lens unit leads to the advantage that the fixed structure of the prism unit becomes simple. Further, this location is high in the sensitivity given to the movement of an image when the vertical angle of the prism is changed, and this leads to the effect that the range of the vairable angle can be made small.

Figure 10:
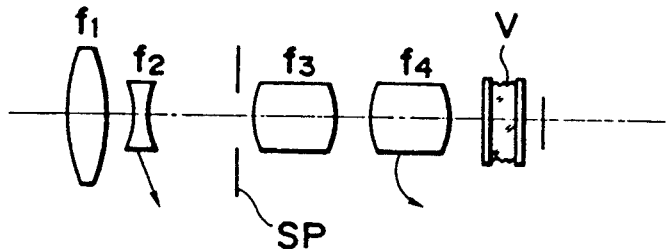

The embodiment of FIG. 10 is one in which the prism unit V is disposed between the zoom lens and the image plane, and has the same advantage as that of the FIG. 6 embodiment.

The refractive power (1/f) arrangements and the principal point spacings ($e_W$ and $e_T$) of each respective lens unit at the wide angle end and the telephoto end in Embodiments 1-9 corresponding to FIGS. 1 and 3-4 will be shown below. Also, the correspondence relations between the respective embodiments and the conditional expression will be shown below.

| Embodiment | $f_1$ | $f_2$ | $f_3$ | $f_4$ | $f_{41}$ | $f_{42}$ | $f_{43}$ |
|---|---|---|---|---|---|---|---|
| 1 | 38.66 | −7.6 | −35.96 | 20.91 | | | |
| 2 | 33.36 | −7.6 | −40.64 | 18.69 | | | |
| 3 | 33.42 | −7.6 | −35.94 | 20.04 | | | |
| 4 | 33.42 | −7.6 | −35.94 | | 22.88 | 32.89 | 44.81 |

| | $e_{1W}$ | $e_{2W}$ | $e_{3W}$ | $e_{41}$ | $e_{42}$ | $e_{1T}$ | $e_{2T}$ | $e_{3T}$ |
|---|---|---|---|---|---|---|---|---|
| 1 | 11.0 | 23.28 | 18.85 | | | 28.61 | 6.71 | 17.80 |
| 2 | 5.65 | 27.91 | 12.65 | | | 23.14 | 11.00 | 12.07 |
| 3 | 5.65 | 23.28 | 17.35 | | | 23.20 | 6.30 | 16.78 |
| 4 | 5.65 | 23.28 | 3.40 | 5.77 | 24.08 | 23.20 | 6.30 | 2.83 |

| Embodiment | $f_1$ | $f_2$ | $f_3$ | $f_4$ |
|---|---|---|---|---|
| 5 | 33.42 | −7.6 | −35.94 | 21.09 |
| 6 | 37.41 | −7.35 | 25.42 | 18.80 |
| 7 | 36.05 | −7.35 | 25.42 | 18.80 |
| 8 | 32.91 | −7.35 | 25.42 | 18.80 |
| 9 | 32.91 | −7.35 | 25.42 | 18.80 |

| | $e_{1W}$ | $e_{2W}$ | $e_{3W}$ | $e_{1T}$ | $e_{2T}$ | $e_{3T}$ |
|---|---|---|---|---|---|---|
| 5 | 5.65 | 23.28 | 19.16 | 23.20 | 6.30 | 18.59 |
| 6 | 11.00 | 22.42 | 16.87 | 27.86 | 5.56 | 18.28 |
| 7 | 9.50 | 27.01 | 16.87 | 26.36 | 10.16 | 17.68 |
| 8 | 6.50 | 22.42 | 22.00 | 23.35 | 5.56 | 23.59 |
| 9 | 6.50 | 22.42 | 16.87 | 23.35 | 5.56 | 18.28 |

| Conditional expression | Embodiment | | | | | | | | |
| | 1 | 2 | 3 | 4 | 5 | 6 | 7 | 8 | 9 |
|---|---|---|---|---|---|---|---|---|---|
| $|Fa|/$ | 0.49 | 0.19 | 0.10 | 0.18 | 0.13 | 0.60 | 0.27 | 0.77 | 0.13 |

-continued

| Ft |
|---|
|  |

In the above-described embodiments, a curvature may be given to the outer side of the end plate of the prism unit to thereby endow it with a lens action.

Also, a material absorbing and cutting infrared light can be mixed with the liquid in the prism unit to thereby make the prism unit act also as an infrared cut filter, and if an infrared cut layer is deposited by evaporation on the surface of the end plate of the prism unit, the costs of material and assembly can be reduced as compared with a case where an infrared cut filter is provided separately.

On the other hand, the present invention can be utilized in a tracking system in addition to an anti-vibration system.

The above-described present invention is a photo-taking lens of variable magnification and yet achieves the excellent effect that the variable vertical angle prism unit is not made bulky and the quality of image is not deteriorated particularly by ghost or flare.

What is claimed is:

1. An optical apparatus for stabilizing an image, comprising:
    an objective lens having a plurality of lens units, the spacing of at least one of said lens units being changed to effect zooming; and
    an optical unit whose vertical angle can be changed to refract light from said objective lens, a transparent and flexible material being sealed in said optical unit, said optical unit being disposed immediately following a predetermined lens surface which satisfies a condition $|Fa| < 10$ Ft, where Fa is the combined effective focal length from the front lens surface of said objective lens to said predetermined lens surface, and Ft is the focal length of said objective lens at the telephoto end thereof.

2. An optical apparatus according to claim 1, wherein at least two of said lens units move along the optic axis to effect zooming, and said optical unit is located rearwardly of said at least two lens units.

3. An optical apparatus according to claim 2, wherein said optical unit is located rearwardly of the last lens surface of said objective lens.

4. An optical apparatus for stabilizing an image, comprising:
    an objective lens having a total focal length at the telephoto end Ft; and
    an optical unit located immediately behind a lens portion of said objective lens, a transparent and flexible material being sealed in said optical unit, said lens portion having a variable focal length Fa, said optical unit transmitting and refracting a light beam for stabilizing the image of said objective lens;
    wherein said optical apparatus satisfies a condition that:
    $|Fa| < 10$ Ft.

5. An optical apparatus according to claim 4, wherein said optical unit is a variable angle prism unit.

6. An optical apparatus according to claim 4, wherein said objective lens is a zoom lens and said optical unit moves in synchronism with zooming operation of said zoom lens.

7. An optical apparatus according to claim 1, wherein said objective lens includes an aperture and said optical unit is located adjacent to said aperture.

8. An optical apparatus according to claim 4, wherein said objective lens includes an aperture and said optical unit is located adjacent to said aperture.

9. An optical apparatus according to claim 1, further comprising a solid-state image pickup device, disposed at the imaging plane of said objective lens, for receiving the image stabilized by said optical lens.

10. An optical apparatus according to claim 4, further comprising a solid-state image pickup device, disposed at the imaging plane of said objective lens, for receiving the image stabilized by said optical unit.

* * * * *

UNITED STATES PATENT AND TRADEMARK OFFICE
CERTIFICATE OF CORRECTION

PATENT NO. : 5,315,435
DATED : May 24, 1994
INVENTOR(S) : AKIHISA HORIUCHI

It is certified that error appears in the above-indentified patent and that said Letters Patent is hereby corrected as shown below:

<u>COLUMN 2</u>,

Line 15, "|Fa| < 10 FT," should read --|Fa| < 10 Ft,--.

<u>COLUMN 6</u>,

Line 35, "lens." should read --unit.--

Signed and Sealed this

First Day of November, 1994

*Attest:*

BRUCE LEHMAN

*Attesting Officer*    *Commissioner of Patents and Trademarks*